United States Patent
Breitenfeld et al.

(10) Patent No.: US 10,904,682 B2
(45) Date of Patent: Jan. 26, 2021

(54) METHOD OF MANUFACTURING A COMPONENT OF A HEARING DEVICE AND COMPONENT

(71) Applicant: SIVANTOS PTE. LTD., Singapore (SG)

(72) Inventors: Patrick Breitenfeld, Bad Salzuflen (DE); Michael Bulk, Herford (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 16/435,753

(22) Filed: Jun. 10, 2019

(65) Prior Publication Data

US 2019/0379987 A1 Dec. 12, 2019

(30) Foreign Application Priority Data

Jun. 8, 2018 (DE) .................. 10 2018 209 173

(51) Int. Cl.
*H04R 25/00* (2006.01)
*B33Y 50/00* (2015.01)
*G01B 11/24* (2006.01)
*H04R 25/02* (2006.01)

(52) U.S. Cl.
CPC ......... *H04R 25/658* (2013.01); *H04R 25/652* (2013.01); *B33Y 50/00* (2014.12); *G01B 11/24* (2013.01); *H04R 25/02* (2013.01); *H04R 2225/77* (2013.01)

(58) Field of Classification Search
CPC .... H04R 25/658; H04R 25/652; H04R 25/02; H04R 2225/77; B33Y 50/00; G01B 11/24

USPC ........................................... 381/322
See application file for complete search history.

(56) References Cited

U.S. PATENT DOCUMENTS

| | | | | |
|---|---|---|---|---|
| 3,154,172 A | * | 10/1964 | Tibbetts | H04R 1/22 181/170 |
| 6,751,494 B2 | | 6/2004 | Collier et al. | |
| 8,638,964 B2 | | 1/2014 | Vaarbroe et al. | |
| 9,774,962 B2 | | 9/2017 | Karamuk et al. | |
| 2003/0002685 A1 | * | 1/2003 | Werblud | A61B 7/04 381/67 |
| 2006/0042868 A1 | | 3/2006 | Berg et al. | |
| 2006/0218763 A1 | * | 10/2006 | Jiles | H04R 17/00 29/25.35 |
| 2007/0014427 A1 | * | 1/2007 | Schafer | H04R 7/06 381/429 |
| 2015/0289069 A1 | * | 10/2015 | Poulsen | H04R 25/652 381/328 |

FOREIGN PATENT DOCUMENTS

| | | |
|---|---|---|
| EP | 1385355 A1 | 1/2004 |
| EP | 1629802 A1 | 3/2006 |

(Continued)

*Primary Examiner* — Sean H Nguyen
(74) *Attorney, Agent, or Firm* — Laurence A. Greenberg; Werner H. Sterner; Ralph E. Locher

(57) ABSTRACT

In a method for manufacturing a component for a hearing device, at least one ear canal of a wearer for whom the hearing device is intended is measured and measurement data of the ear canal is then generated. A first value for a material property of at least a first demarcated region of the component is set based on the measurement data. The component is prepared in such a way that the material property has the first value for at least the first demarcated region of the finished component.

11 Claims, 2 Drawing Sheets

(56) References Cited

FOREIGN PATENT DOCUMENTS

| | | |
|---|---|---|
| EP | 3051843 A1 | 8/2016 |
| EP | 2335426 B1 | 7/2017 |
| WO | 2014108200 A1 | 7/2014 |

* cited by examiner

METHOD OF MANUFACTURING A COMPONENT OF A HEARING DEVICE AND COMPONENT

CROSS-REFERENCE TO RELATED APPLICATION

This application claims the priority, under 35 U.S.C. § 119, of German application DE 10 2018 209 173.0, filed Jun. 8, 2018; the prior application is herewith incorporated by reference in its entirety.

BACKGROUND OF THE INVENTION

Field of the Invention

The invention relates to a method of manufacturing a component of a hearing device, wherein a first value is set for a material property of at least a first demarcated region of the component, and wherein the component is manufactured such that the material property has the first value for at least the first demarcated region of the finished component.

Hearing devices are usually configured in such a way that when the hearing device is worn, a component completely or at least partially closes the wearer's ear canal in order to be able to better shield the wearer's hearing system from undesirable background noises while also suppressing acoustic feedback from the output sound of the hearing device propagated in the ear canal of the wearer that is fed back to a microphone of the hearing device. Depending on the type of device, the component that closes the ear canal may be a protruding extension of the housing (e.g. ITE devices), or it may be an earmold that sits at the end of a sound tube that is intended to guide the generated sound from a loudspeaker arranged in the housing of the hearing device to the wearer's hearing system (BTE devices).

The correct fit of the component in the wearer's ear canal in this case is important, first, for the wearing comfort, whereby for example the fitted component should preferably avoid strong pressure points in the ear canal. Second, correct mechanical adaptation of the component to the ear canal is also relevant from an acoustic standpoint, either for suppressing the aforementioned acoustic feedback, or for correctly transmitting the output sound the hearing device generates to the wearer's hearing system.

For greater adaptability, the elasticity of the components of the hearing device that are intended to be worn in the ear canal—i.e. the earmold or housing shell—may be adapted as required, and in some cases may also have different elasticities over the component as a whole. A hearing device acoustician may select the suitable elasticity distribution for the aforementioned component for a given wearer. However, there are no binding objective criteria for this selection. The hearing device acoustician will typically rely on their professional experience with hearing device wearers who have comparable hearing loss, a comparable shape of the auricle or other comparable characteristics of the ear and hearing system.

Due to the lack of objective criteria, particularly for selecting the elasticity of the component to be worn in the ear, there is always a risk that the hearing device acoustician's choice may not be satisfactory for the wearer. In this case a new component must be prepared and optionally tried out, leading to costs as well as unwanted delays for the wearer, before the wearer is able to make proper use of the hearing device.

SUMMARY OF THE INVENTION

Accordingly, the object of the invention is to provide a method of manufacturing a component of a hearing device that is intended to offer the hearing device wearer a particularly high level of wearing comfort with the simplest possible preparation.

This goal is achieved according to the invention by a method of manufacturing a component of a hearing device, wherein at least one ear canal of a wearer for whom the hearing device is intended is measured, and ear canal measurement data are generated, wherein a first value for a material property of at least a first demarcated region of the component is set based on the measurement data, and wherein the component is produced in such a way that the material property has the first value for at least the first demarcated region of the finished component. Configurations that are advantageous and in part inventive in their own right are the subject matter of the dependent claims and the following description.

Preferably, a component of the hearing device is produced which, when the hearing device is used in accordance with its intended purpose, is intended to close or at least partially close the wearer's ear canal by appropriate insertion. In particular, the component may be a housing shell of the hearing device or an earmold or an earpiece ("dome"). The measurement of the ear canal of a wearer for whom the hearing device is intended comprises, in particular, individually adapting the relevant component of an unfinished hearing device to a particular wearer, or to the wearer's ear canal.

The measurement of at least the ear canal is preferably performed in such a way that the measurement data provide a three-dimensional model of the ear canal and preferably also of the entrance to the ear canal, to at least the depth up to which the component to be manufactured will be introduced into the ear canal during proper use of the hearing device. If, for example, the component protrudes 5 mm into the ear canal when the hearing device is worn properly, measured from the ear canal entrance, the measurement data provide a three-dimensional model of the ear canal, preferably to a depth of at least 5 millimeters, and particularly preferably deeper by at least half the diameter of the ear canal. Parts of the concha that adjoin the ear canal on the outside are preferred here. In particular, the measurement data are available in a format standardized for further processing, for example as volume elements ("voxels") with corresponding information as to whether body tissue is present in the relevant the volume element or whether the volume element is associated with the ear canal. Structures that adjoin the ear canal, such as a concha, which are included in the measurement and thus are represented in the measurement data, are also preferred.

A material property is in particular a material property that describes a reaction of the component to mechanical loads, i.e. in particular a elasticity modulus (E modulus) or a stiffness. The "elasticity modulus" may be explicitly predetermined as a numerical value, or implicitly predetermined via a value of another material property which, possibly in combination with a desired shape of the component, directly influences the elasticity modulus, for example via a stiffness or tensile strength value.

Setting a first value for a material property of at least the first demarcated region of the component contains in particular that the first value for the material property may also be implicitly obtained by selecting a material for the first demarcated region from a plurality of possibilities for the material, each of which respectively has a different value of that material property. Setting the first value for the material property likewise comprises an implicit setting, such that in a preparation process for at least the first demarcated region the value for the material property is a function of an adjustable parameter of the preparation process, and in this case, the value is set by selecting a specific value for the adjustable parameter that leads to the first value for the material property in the preparation process for at least the first demarcated region.

In other words, in the preparation process, there is an adjustable parameter for the first demarcated region that may be used to influence the material property of the first demarcated region. Thus, setting the first value for the material property, as a consequence of the preparation process, corresponds to selecting or presetting the value for the parameter by virtue of which the first demarcated region has the first value for the material property. In this respect, the setting may be made explicitly by specifically presetting the first value for the material property or implicitly via the corresponding parameter value of the preparation process.

At least the first demarcated region and in particular the component is preferably manufactured by a preparation process suitable for this purpose, so that the material property has the first value for at least the first demarcated region of the finished component. In particular, if the component has a second demarcated region that is separated from the first demarcated region, preparation of the component may also take place in a plurality of preparation steps, with a single preparation step preferably being provided for preparing a respective demarcated region. In particular, the first demarcated region may extend over the entire component, for example, if the component is provided in the form of an earpiece.

In setting the first value of the material property based on the measurement data, anatomical details of the geometry of the intended wearer's ear canal are preferably taken into account. In particular, a risk of acoustic feedback, as may be deduced from the measurement data, may also be taken into account in this case, for example in the case that a housing shell of a hearing device would actually require a higher strength at a point of curvature for reasons of stability, but due to the individual geometry of the wearer's ear canal and due to the stronger acoustic reflections on harder materials, this region may have to be furnished with a softer material.

For the first value of the material property, an E-modulus value is preferably set. First, the elasticity or stiffness of hearing device components, which are to be worn completely or partially in the ear canal, is critical for correctly seating the component in the ear canal and thus for ensuring that to the extent possible, sound is transmitted to the wearer's hearing system as envisioned. Second, due to the multiple curvatures of the ear canal and the small thickness of the skin layer at many points in the ear canal, a sufficiently high elasticity of the component is important for individual wearing comfort. The procedure proves to be particularly advantageous in this context.

If, for example, the component consists of a housing shell of an ITE hearing device, a considerable improvement in wearing comfort may be achieved by targetedly varying the elastic modulus along the housing shell, i.e. by targetedly selecting of the first demarcated region based on the measurement data and assigning the first value for the elastic modulus accordingly. The housing of an ITE hearing device typically consists of a housing shell having a flattened, open end, to which a faceplate is glued or otherwise affixed. For a good and durable bonding or fixation, both the faceplate and the housing shell are preferably made of a hard material in order not to allow any displacement of these two parts against each other at their joint. A central part of the housing shell preferably consists of a softer material, because wearers of a hearing device often perceive such a material as more comfortable. At the end that is intended to be worn in the ear canal, the housing shell is preferably again made of harder material, for example to make it possible to install and affix a cerumen filter.

At present, a transition between hard and soft material for the housing shell is challenging to achieve. For this purpose, for example, a soft cuff would have to be fixed around the hard housing shell in the intended region. This involves a great deal of effort from a preparation standpoint, and also, such a cuff may often be unable to withstand frequent insertion and withdrawal of the hearing device into or out of the ear canal. In contrast, one configuration of the invention proposes to divide a first demarcated region and, if necessary, additional demarcated regions in the component—represented here by way of example by the housing shell—based on the measurement data, with a certain elasticity modulus value being assigned to the first demarcated region based on the measurement data.

In a multi-stage preparation process, for example a 3D printing process, the component is now manufactured according to the specified values for the elasticity modulus, i.e. in the above example of a 3D printing process, by using granules and/or materials suitable for achieving the elasticity modulus and/or an energy input for the first demarcated region. As a result, it may be achieved that the specified region in the finished component has the desired elasticity modulus.

The ear canal is preferably measured directly by optical and/or acoustic means in order to generate the measurement data. Direct measurement with acoustic means preferably contains three-dimensional ultrasonic measurement in particular. Direct measurement with optical devices preferably comprises in particular a three-dimensional reader scan as well as an X-ray measurement in particular, and this may also be carried out tomographically. In other words, direct measurement is a measurement procedure that is carried out directly on the intended wearer's ear canal using the aforementioned physical devices.

In an alternative configuration of the invention, an impression of the ear canal is created to generate the measurement data, and the measurement data is generated based on the print. The impression is preferably made using a malleable material that hardens after a predetermined time. To generate the measurement data, the impression is measured in particular by optical devices, for example by a three-dimensional laser scan.

In particular, the ear canal may be measured for a plurality of possible objectives that the wearer may have, with a separate subset of measurement data being generated in each of the desired jaw positions for direct measurement by optical and/or acoustic devices, and in the case of measurement by an impression, a separate impression is generated for each of the desired jaw positions and measured accordingly, and thus a respective subset of measurement data is respectively generated. In particular, spatial regions in the ear canal may be identified, the geometry of which varies particularly with a variation of jaw positions. A corresponding demarcated region of the component to be manufactured, which, when worn as intended, is located in such a region of the ear canal having a particularly variable geometry, may be provided with a higher elasticity modulus and may be prepared accordingly.

Advantageously, in order to set the first value of the material property from among a plurality of predetermined raster values, it is evaluated based on the measurement data. In particular, in the case of an implicit setting via a corresponding parameter of the preparation process for at least the first demarcated region, this comprises setting the value of the material property by selecting the parameter value from a predetermined group of possible values.

It also proves advantageous if, based on the measurement data, a second value for the material property of the component, different from the first value, is set for a second demarcated region of the component separate from the first demarcated region, and the component is preferably prepared by a correspondingly suitable preparation process, such that the material property has the second value for the second demarcated region of the manufactured component. In particular, in this case, the geometry of the second demarcated region is ascertained based on the measurement data. This allows a controlled variation of the material property across the component.

Preferably, for the elasticity modulus the first value is set so as to be greater than the second value, and a region that forms a free end of the component is prepared as the first demarcated region of the component. This allows the free end of the first demarcated region to have high strength, while the second demarcated region may be designed to be softer due to the lower elasticity modulus, which usually results in the wearer enjoying greater wearing comfort for this region.

Favorably, for a first demarcated region of the component, a region is prepared that forms a free end to be worn in the ear canal when the component is worn as intended, and for a second demarcated region of the component, a region is prepared that is separated from the wearer's hearing system by the first demarcated region when the component is worn as intended, and thus when the component is worn as intended, the free end of the first demarcated region lies between the hearing system, in particular the eardrum, and the second demarcated region. Wearing the component as intended means in particular that the wearer of the associated hearing device wears the component on or at least partially in the ear, in such a way as is intended and necessary for the functioning of the hearing device.

This means that the free end, which forms the first demarcated region, projects into the ear canal when worn as intended, and the second demarcated region, which is prepared so as to be softer or more elastic than the said free end of the first demarcated region as a result of the lower second value for the elasticity modulus, may likewise be worn partially in the ear canal, but lying further toward the exterior. This allows a comfortable wearing feeling to be achieved in the ear canal in the second demarcated region, while the free end, which the first demarcated region forms, may have enough strength to attach, for example, a cerumen filter or the like.

Advantageously, a third value of the elasticity modulus, different from the second value, is set based on the measurement data, for a third demarcated region of the component separate from the second demarcated region; and the component is prepared in such a way that the elasticity modulus has the third value for the third demarcated region of the finished component. In particular, this allows varying the elasticity modulus across the component.

Preferably in this case, for the elasticity modulus, the third value is set to be greater than the second value, and a region that forms a free end of the component is prepared as the third demarcated region of the component. This means that the component has one free end as the first demarcated region, another free end as the third demarcated region, and a second demarcated region that is arranged between the free ends, with the free ends having a higher strength. The first demarcated region is preferably worn in an inward direction in the ear canal when worn as intended, while the third demarcated region forms the outwardly directed free end of the wearer's hearing system. In particular, a cover plate (or "faceplate") may be attached to this free end that the third demarcated region forms, or the third demarcated region may comprise such a faceplate. Preferably, the third value E3 of the E-modulus may be set to be identical to the first value E1 of the E-modulus, i.e. E1=E3.

At least the first demarcated region of the component and optionally the second demarcated region is expediently prepared by a 3D printing process, taking into account the first value and optionally the second value for the material property. The recent development of 3D printing processes shows that it is possible to control material properties such as a elasticity modulus specifically by varying a parameter in the 3D printing process, for example by using a starting material, via its grain size and/or density, or via local energy input through the laser used in the 3D printing process. This is already being implemented today in special process types in the 3D printing field. By correspondingly varying the parameter, different demarcated regions of the component may be prepared that have respectively different values for the material property.

In particular, the second demarcated region of the component is prepared in this case by a 3D printing process taking into account the second value for the material property, and the first demarcated region and the second demarcated region are joined together to finish the component. In particular, this comprises directly joining the first demarcated region and second demarcated region as well as indirectly joining via another section that separates the first demarcated region from the second demarcated region. Preferably, the first demarcated region and second demarcated region are respectively prepared as separate sections.

Alternatively, the first demarcated region and second demarcated region of the component may be prepared integrally by a 3D printing process, and the first value and second value, respectively, of the material property may be set for the first and the second demarcated region via a corresponding parameter of the 3D printing process. In consequence, during the 3D printing process, a first value is selected for the parameter that controls the material properties, and this results in a first value for the material property. In this way, the first demarcated region is prepared. The preparation process is then varied with regard to the parameter in the 3D printing process, so that the second value of the material property is selected via the parameter that has now been changed. As a result, the second demarcated region seamlessly follows the first demarcated region in the course of preparation. In particular, additional demarcated regions may be prepared integrally in such a way that all of the demarcated regions make up all of the components. This allows for a diverse variation profile of the material property over the entire component.

Particularly preferably, the component is prepared as at least one part of a housing and/or an earmold and/or an earpiece. Because these components are respectively at least partially present in the ear canal when the hearing device is worn, and therefore it is particularly desirable to be able to vary the material property, the method is particularly advantageous for manufacturing in this case.

The invention also specifies a component for a hearing device that may be obtained via the above-described preparation process. The advantages and refinements of the method may be transferred analogously to the component.

Other features which are considered as characteristic for the invention are set forth in the appended claims.

Although the invention is illustrated and described herein as embodied in a method of manufacturing a component of a hearing device and the component itself, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Components and magnitudes that correspond to each other are respectively assigned the same reference signs in all drawings.

Figure 1:
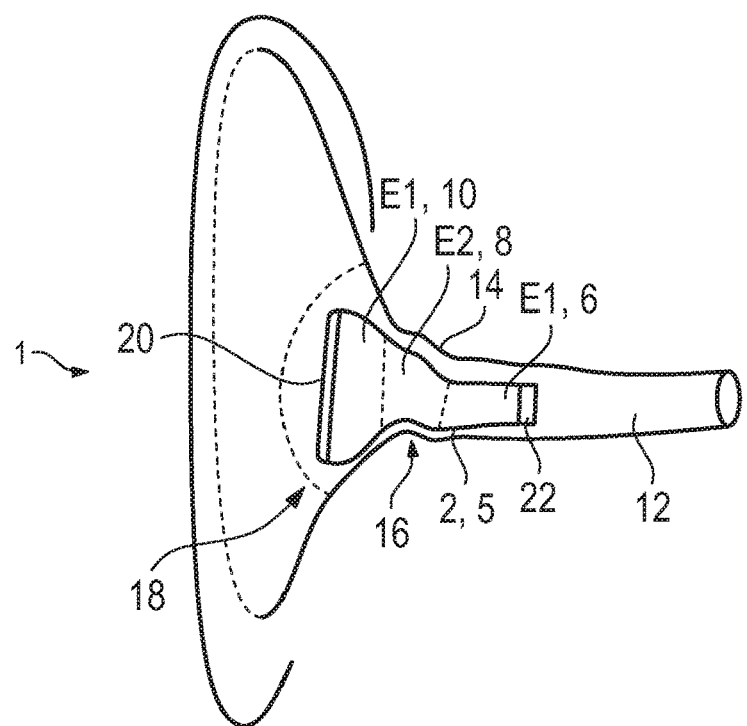
FIG. 1 is a diagrammatic, cross-sectional view of an ITE hearing device that has a plurality of regions of different elasticity and is worn in an ear canal.

FIG. 1 shows a schematic cross-section of an ear 1 of a wearer of a hearing device 2, who is not otherwise shown. The hearing device 2 in this case is configured as an ITE device, a housing shell 5 of which has a first demarcated region 6, a second demarcated region 8 and a third demarcated region 10. The relatively narrow first demarcated region 6 partially protrudes into the wearer's ear canal 12. The second demarcated region 8 forms a curve in the housing shell 5, via which the hearing device 2 is guided around the entrance 14 of the ear canal 12. Here, the second demarcated region is a projection 16 that a cartilage layer forms in the region of the entrance 14 of the ear canal 12. The third demarcated region 10, which is fitted into the wearer's concha 18, has an extension for a better fit. The third demarcated region 10 is covered by a faceplate 20. Due to its dimensions, the housing shell 5 of the hearing device 2 almost completely closes the ear canal 12, so as to offer the wearer better wearing comfort.

The first demarcated region 6 has elasticity modulus E1, which corresponds to a comparatively high strength, because at the end protruding into the ear canal 12, which the first demarcated region 6 forms, a cerumen filter 22 is built into the hearing device 2, and for this purpose a higher strength and stiffness is advantageous. In order not to exert any uncomfortable pressure on the projection 16, particularly through the second demarcated region 8, the second demarcated region has an elasticity modulus E2<E1, which corresponds to a comparatively high elasticity of the material in the second demarcated region 8. This allows the second demarcated region 8 to gently lie against the curvature of ear canal 12 at the ear canal entrance 14 in the vicinity of the curvature of the ear canal 12. The third demarcated region also has the elasticity modulus E1, because the correspondingly high strength is advantageous for connecting to the faceplate 20. In this case, the hearing device 2 with its three demarcated regions 6, 8, 10 in the housing shell 5 has the advantage that the first and the third demarcated regions 6, 10 have sufficient strength (elasticity modulus E1) for installing the cerumen filter 22 and connecting to the faceplate 20, respectively, but the second demarcated region 8 has improved wearing comfort. The region of the projection 16 in particular has a higher elasticity (elasticity modulus E2).

Figure 2:
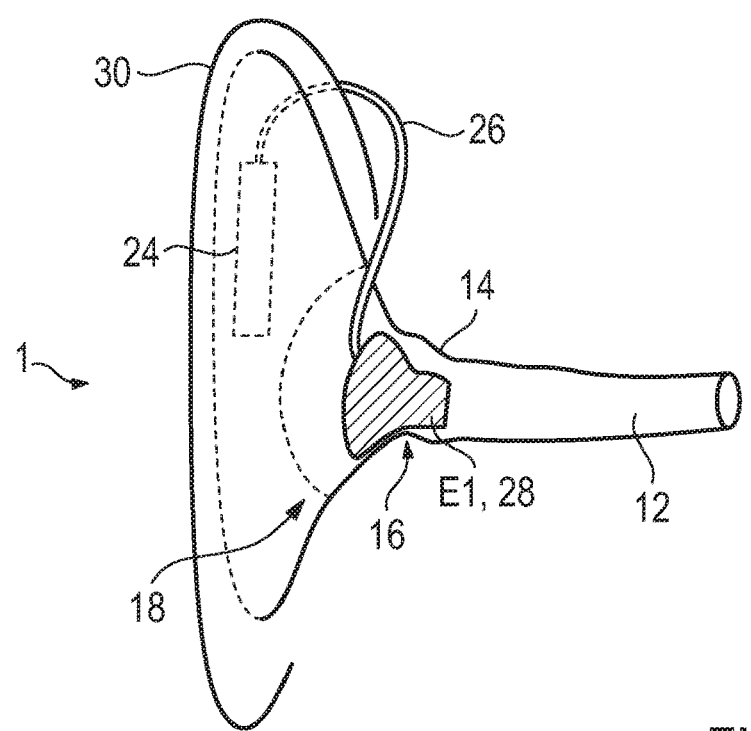
FIG. 2 is a cross-sectional view of a BTE hearing device that has an earpiece and is worn in an ear canal.

FIG. 2 shows a schematic cross-section of an alternative configuration of a hearing device 2'. The hearing device 2' in this case is configured as a BTE device. The hearing device 2' has a housing 24, a sound tube 26 connected to the housing 24, and an earpiece 28 attached to the other end of the sound tube 26. In this case, the housing 24 is worn behind the pinna 30 of ear 1, and an output sound of the hearing device 2' generated in the housing 24 is guided to the earpiece 28 via the sound tube 26. The earpiece 28 is located in the concha 18, but in the region of the projection 16 it protrudes into the ear canal entrance 14. For a stable fit of the earpiece 28, the earpiece is made of a material with a comparatively high elasticity (E modulus E1), so that the earpiece 28 may adapt better to the concha 18 and the entrance 14 of the ear canal 12.

Figure 3:
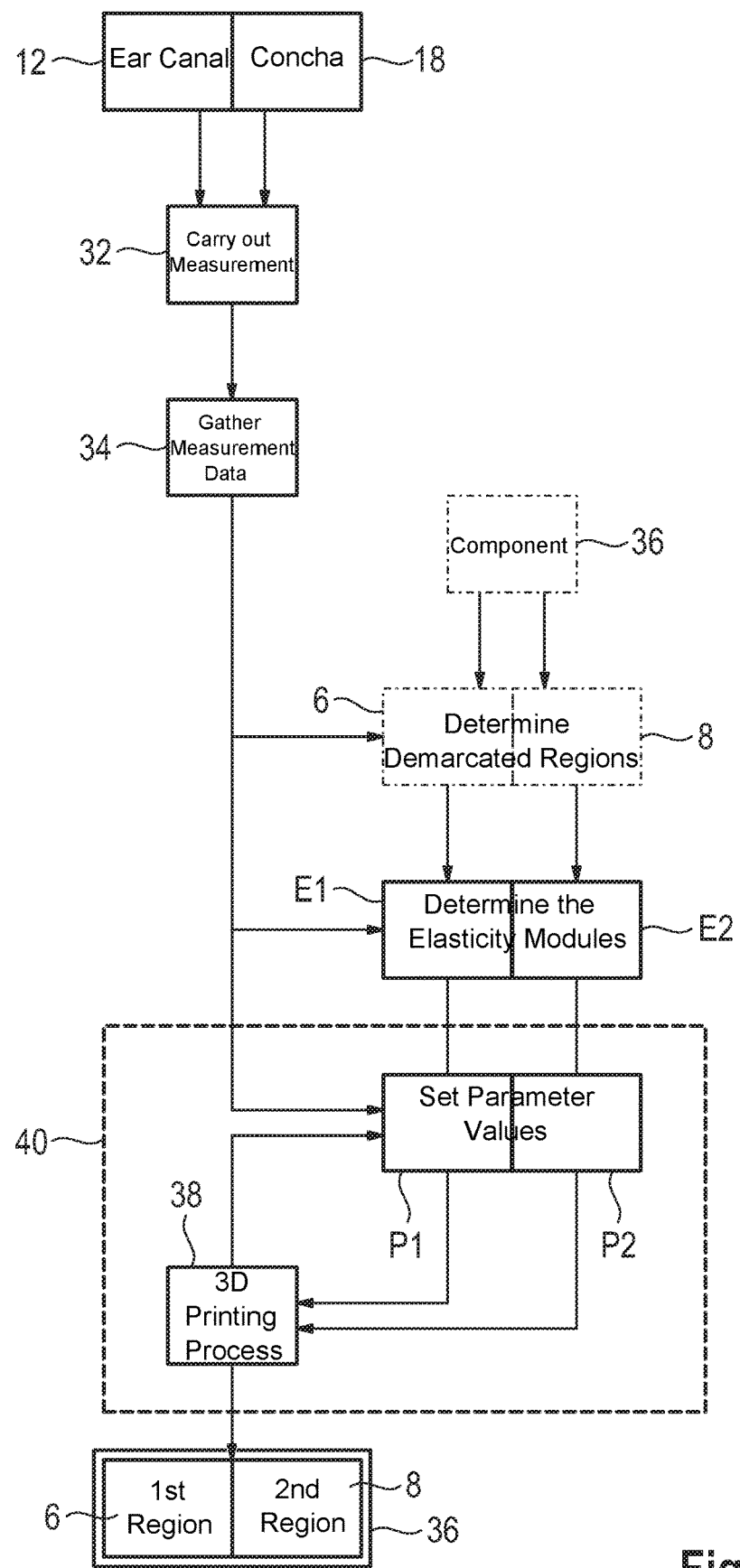
FIG. 3 is a schematic block diagram of a method for manufacturing hearing devices according to FIG. 1 and FIG. 2 based on the individual anatomy of the ear canal.

FIG. 3 shows a schematic block diagram of a method for manufacturing the hearing device 2 or 2' according to FIG. 1 or FIG. 2. First, a measurement 32 is carried out of the ear canal 12 and the surrounding region with the concha 18. This measurement may be done by a direct scan using ultrasound or laser, or by taking an impression of the region to be measured in the ear canal 12 and concha 18 and subsequently performing a laser scan of the impression. In the measurement 32, measurement data 34 are generated regarding the ear canal and the adjacent concha 18, for example in the form of voxel-wise information about whether body tissue or air is present. Based on these measurement data 34, at least a first demarcated region 6 and a second demarcated region 8 and possibly additional demarcated regions in the component, which preferably have different strengths or different elasticities, are now ascertained for a component 36, which for example may be in the form of the housing shell 5 of the hearing device 2 according to FIG. 1 or by the earpiece 28 of the hearing device 2' according to FIG. 2.

After ascertaining the first and second demarcated regions 6, 8 and, if necessary, additional demarcated regions, an E modulus E1 or E2 is set for each demarcated region 6, 8 based on the measurement data 34. For a 3D printing process 38 for preparation, the parameter values P1 or P2 of the 3D printing process 38 that may be used to set the respectively desired elasticity modulus E1 or E2 are now ascertained. The parameter values P1, P2 may be, for example, values for a local energy input by a laser in the 3D printing process 38, or a bulk density or grain size for a granulate of a starting material used in the 3D printing process 38. In particular, the parameter values P1 and P2, which in the 3D printing process lead to a finished material with elasticity modulus E1 or E2, may each respectively describe a plurality of individual variables of the type mentioned, and thus may be vector-valued.

The first demarcated region 6 of component 36 is then printed using the 3D printing process 38, the parameter value P1 having been set. The settings are then changed in the 3D printer 40 in such a way that the parameter value P2 is now available, for example by changing the default settings for a laser of the 3D printer that processes the granulate of the starting material, or by replacing the granulate with one that has a correspondingly different composition. The second demarcated region 8 of the component 36 is then printed integrally with the first demarcated region 6. If the component 36 is intended to have additional demarcated regions, such that the E modulus will again be respectively changed along the component 36, the parameter values of the 3D printing process 38 may be adjusted accordingly, and the printing may be continued with new parameter values that yield the desired E-modulus until the component 36 has been fully printed.

Although the invention was illustrated and described in greater detail by means of the preferred exemplary embodiment, this exemplary embodiment does not limit the invention. A person of ordinary skill in the art will be able to derive other variations herefrom, without departing from the invention's protected scope.

LIST OF REFERENCE SIGNS

1 Ear
2 Hearing device
5 Housing shell
6 First demarcated region
8 Second demarcated region
10 Third demarcated region
12 Ear canal
14 Entrance
16 Projection
18 Concha
20 Faceplate
22 Wax filter
24 Housing
26 Sound tube
28 Earpiece
30 Pinna
32 Measurement
34 Measurement data
36 Component
38 3D printing process
40 3D printer
E1, E2 E modulus
P1, P2 Parameters

The invention claimed is:

1. A method of manufacturing a component of a hearing device, which comprises the steps of:
    measuring at least one ear canal of a wearer for whom the hearing device is intended resulting in a generation of measurement data relating to the ear canal;
    setting a first value for a material property of at least a first demarcated region of the component based on the measurement data, and the component is prepared in such a way that the material property has the first value for at least the first demarcated region of the component;
    setting a value of an elastic modulus as the first value for the material property;
    setting a second value of the material property based on the measurement data for a second demarcated region of the component that is separate from the first demarcated region, the second value being different from the first value and the component is prepared in such a way that the material property having the second value for at least the second demarcated region of the component;
    setting the first value of the elasticity modulus to be greater than the second value;
    preparing a first region of the component as the first demarcated region, forming a free end of the component to be worn in the ear canal when the component is worn as intended; and
    preparing a second region as the second demarcated region of the component that, when the component is worn as intended using the first demarcated region, is at a distance from a wearer's hearing system.

2. The method according to claim 1, which further comprises measuring the ear canal directly by optical and/or acoustic means in order to generate the measurement data.

3. The method according to claim 1, which further comprises creating an impression of at least the ear canal in order to generate the measurement data, and the measurement data is generated based on the impression.

4. The method according to claim 1, wherein for purposes of setting the first value of the material property, selecting the first value from a plurality of predetermined raster values based on the measurement data.

5. The method according to claim 1, which further comprises:
    using the measurement data to set a third value, different from the second value, for an elasticity modulus of a third demarcated region of the component that is separate from the second demarcated region; and
    preparing the component in such a way that the elasticity modulus has the third value for the third demarcated region of the component manufactured.

6. The method according to claim 5, which further comprises:
    setting the third value for the elasticity modulus to be greater than the second value; and
    preparing a third region that forms a further free end of the component as the third demarcated region of the component.

7. The method according to claim 1, which further comprises preparing at least the first demarcated region of the component by means of a 3D printing process that adopts the first value for the material property.

8. The method according to claim 7, which further comprises preparing the second demarcated region of the component by means of the 3D printing process that adopts the second value for the material property, and wherein the first demarcated region and the second demarcated region are joined together for preparing the component.

9. The method according to claim 7, which further comprises preparing the first demarcated region and the second demarcated region of the component integrally by means of the 3D printing process, and the first value and the second value, respectively, of the material property are set for the first demarcated region and the second demarcated region via a corresponding parameter of the 3D printing process.

10. The method according to claim 1, wherein the component is at least one part of a housing, an earmold and/or an earpiece.

11. A component for a hearing device, the component comprising:
    a component body having at least a first demarcated region and a material property, wherein at least one ear canal of a wearer for whom the hearing device is intended is measured resulting in a generation of measurement data relating to the ear canal, a first value for the material property of at least said first demarcated region is set based on the measurement data, and said component body being prepared in such a way that the material property has the first value for at least said first demarcated region of said component body;

the first value for said material property being a value of an elastic modulus;

said material property having a second value being based on the measurement data for a second demarcated region of said component body that is separate from said first demarcated region, the second value being different from the first value and said component body is prepared in such a way that said material property having the second value for at least said second demarcated region of said component body;

wherein the first value of the elasticity modulus being greater than the second value;

said first demarcated region of said component body forms a free end of said component body to be worn in the ear canal when said component body is worn as intended; and said second demarcated region of said component body, when said component body is worn as intended using said first demarcated region, is at a distance from a wearer's hearing system.

* * * * *